(12) United States Patent
Chen

(10) Patent No.: US 10,893,132 B1
(45) Date of Patent: Jan. 12, 2021

(54) MOBILE TERMINAL

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/791,102

(22) Filed: Feb. 14, 2020

(30) Foreign Application Priority Data

Oct. 9, 2019 (CN) .......................... 2019 1 0955778

(51) Int. Cl.
*H04M 1/02* (2006.01)

(52) U.S. Cl.
CPC ...... *H04M 1/0266* (2013.01); *H04M 2201/38* (2013.01); *H04M 2250/12* (2013.01)

(58) Field of Classification Search
CPC ... H04M 1/026; H04M 1/0244; H04M 1/0264
See application file for complete search history.

(56) References Cited

U.S. PATENT DOCUMENTS

| 2015/0122978 | A1 | 5/2015 | deJong et al. |
| 2019/0392752 | A1 | 12/2019 | Chen et al. |
| 2020/0191648 | A1 | 6/2020 | Wang et al. |

FOREIGN PATENT DOCUMENTS

| CN | 109036163 | 12/2018 |
| CN | 109425427 | 3/2019 |
| EP | 3588024 | 1/2020 |
| EP | 3671146 | 6/2020 |

OTHER PUBLICATIONS

Supplementary European Search Report dated Sep. 8, 2020, issued in European Application No. 20160714.0.

*Primary Examiner* — Thanh C Le
(74) *Attorney, Agent, or Firm* — Oblon, McClelland, Maier & Neustadt, L.L.P.

(57) ABSTRACT

A mobile terminal including a display panel, a light sensor, and a first polarizing component. The display panel is between the first polarizing component and the light sensor. The ambient light having passed through the first polarizing component is linear polarized light. The light sensor includes N first regions and M second regions, the total area of the N first regions is equal to that of the M second regions. Each of the first regions includes a second polarizing component and K photodetectors. The second polarizing component is located above the K photodetectors. Each of the second regions includes a third polarizing component and L photodetectors. The third polarizing component is located above the L photodetectors. The polarization direction of the second polarizing component is parallel to that of the first polarizing component. The polarization direction of the second polarizing component is perpendicular to that of the third polarizing component.

10 Claims, 5 Drawing Sheets

MOBILE TERMINAL

CROSS-REFERENCE TO RELATED APPLICATION

The present application is based on and claims priority for Chinese patent application No. 201910955778.0 filed on Oct. 9, 2019, the entire content of which is incorporated herein by reference.

TECHNICAL FIELD

The disclosure relates to the technical field of terminals, and particularly to a mobile terminal.

BACKGROUND

Full-screen mobile terminals have become a development trend of mobile terminals. However, optical sensing devices such as range sensors and cameras have become an obstacle to the improvement of a screen-to-body ratio. Arranging a light sensor below a screen of a mobile terminal can improve the screen-to-body ratio. However, the light sensor below the screen of the mobile terminal will be affected by light leak of the screen, thus leading to inaccurate detection results.

SUMMARY

Aspects of the disclosure can provide a technique for improving the detection accuracy of a light sensor in a mobile terminal. According to one aspect of embodiments of the disclosure, a mobile terminal is provided that includes a display panel, a light sensor, and a first polarizing component. The display panel is located between the first polarizing component and the light sensor, and the light sensor is configured to receive ambient light and light emitted by the display panel. The ambient light is incident onto the light sensor after passing through the first polarizing component and the display panel. The ambient light having passed through the first polarizing component is linearly polarized light.

The light sensor can include N first regions and M second regions, and a total area of the N first regions is equal to that of the NI second regions, where N and M are both natural numbers. Each of the first regions can include a second polarizing component and K photodetectors arranged in an array, and the second polarizing component is located above the K photodetectors. Each of the second regions can include a third polarizing component and L photodetectors arranged in an array, and the third polarizing component is located above the L photodetectors, where K and L are both natural numbers. A polarization direction of the second polarizing component is parallel to that of the first polarizing component, and a polarization direction of the second polarizing component is perpendicular to that of the third polarizing component.

It should be understood that the above general description and detailed description in the below are merely exemplary and explanatory, and are not intended to restrict the disclosure.

BRIEF DESCRIPTION OF THE DRAWINGS

The accompanying drawings herein are incorporated into the specification and constitute part of the present specification, illustrate embodiments consistent with the disclosure and intended for explaining the principles of the disclosure together with the specification.

DETAILED DESCRIPTION

Detailed description will be made here to exemplary embodiments, examples of which are illustrated in the accompanying drawings. When drawings are involved in the following description, identical numerals in different drawings refer to identical or similar elements, unless otherwise indicated. Implementations described in the following exemplary embodiments do not mean all the implementations consistent with the disclosure. On the contrary, they are merely examples of apparatuses and methods consistent with some aspects of the disclosure detailed in the appended claims.

Figure 1:
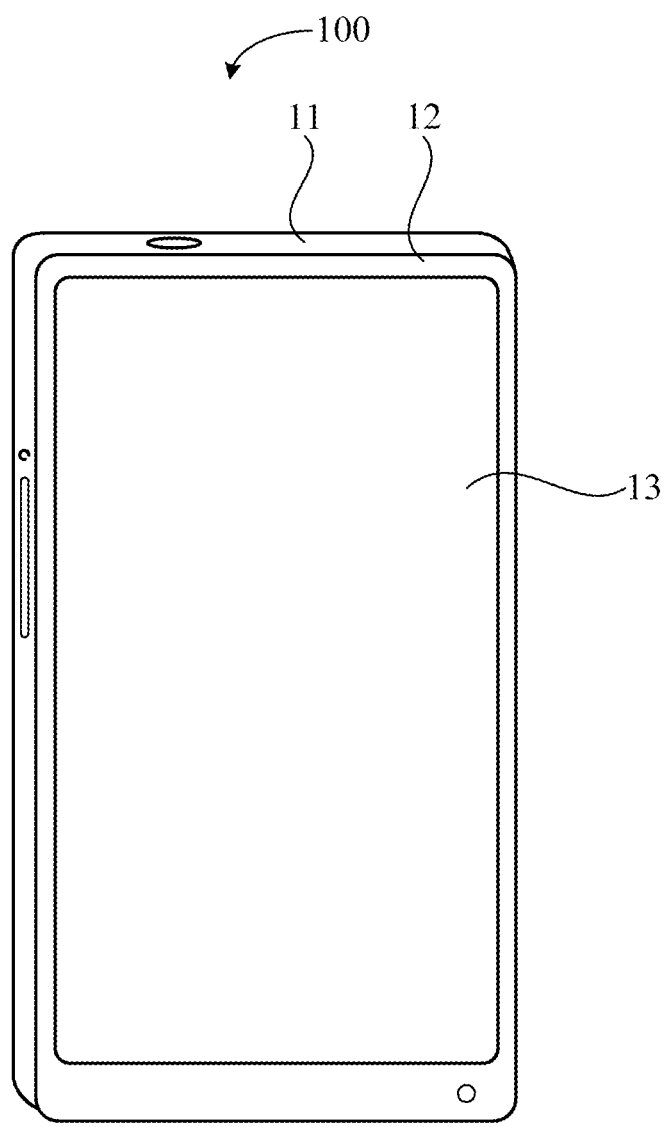
FIG. 1 illustrates a schematic structural diagram of a mobile terminal according to exemplary embodiments of the disclosure.

FIG. 1 illustrates a schematic structural diagram of a mobile terminal 100 according to an exemplary embodiment of the disclosure. The mobile terminal 100 can include a housing 11, a transparent glass cover plate 12, and a display panel 13 located below the glass cover plate 12. The display panel 13 is located within the housing 11. Light emitted by the display panel 13 can transmit through the glass cover plate 12. The display panel 13 can be seen through the transparent glass cover plate 12. The display panel 13 may be, for example, an OLED display panel, which, however, is not limited thereto.

Figure 2:
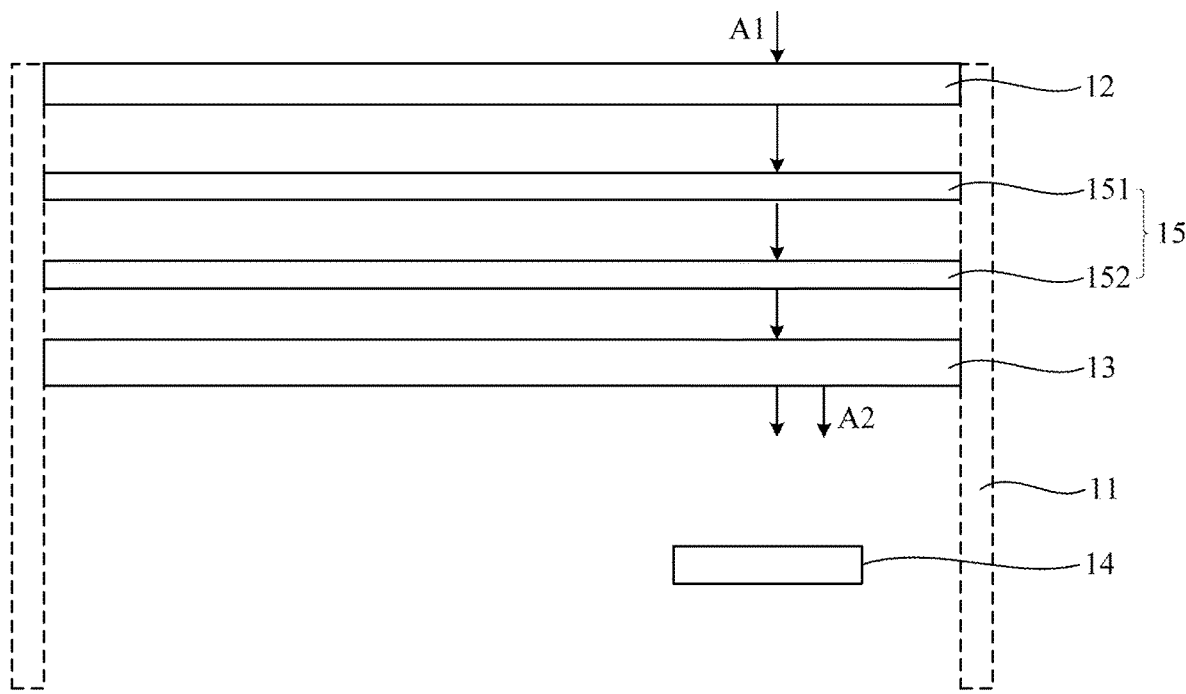
FIG. 2 illustrates a cross-sectional schematic diagram of the mobile terminal according to exemplary embodiments of the disclosure.

FIG. 2 illustrates a cross-sectional schematic diagram of the mobile terminal according to an exemplary embodiment of the disclosure. As illustrated in FIG. 2, the mobile terminal 100 according to embodiments of the disclosure further includes a light sensor 14 and a first polarizing component 15.

As illustrated in FIG. 2, the display panel 13 is located between the first polarizing component 15 and the light sensor 14. The light sensor is configured to receive ambient light A1 and light A2 emitted by the display panel 13. The ambient light A1 is incident onto the light sensor 14 after passing through the first polarizing component 15 and the display panel 13, and the ambient light having passed through the first polarizing component 15 is linear polarized light. In other words, in embodiments of the disclosure, the light sensor 14 is located below the display panel 13, and as such the screen-to-body ratio can be improved. The light emitted towards the light sensor 14 by the display panel 13 includes light leaked from the screen. The light emitted towards the light sensor 14 by the display panel 13 will have influence on the accuracy of the light sensor 14 in detecting the ambient light. If the influence, by the light emitted towards the light sensor 14 by the display panel 13, on the accuracy of the light sensor 14 in detecting the ambient light is eliminated, the accuracy of the light sensor 14 in detecting the ambient light can be improved.

Figure 3:
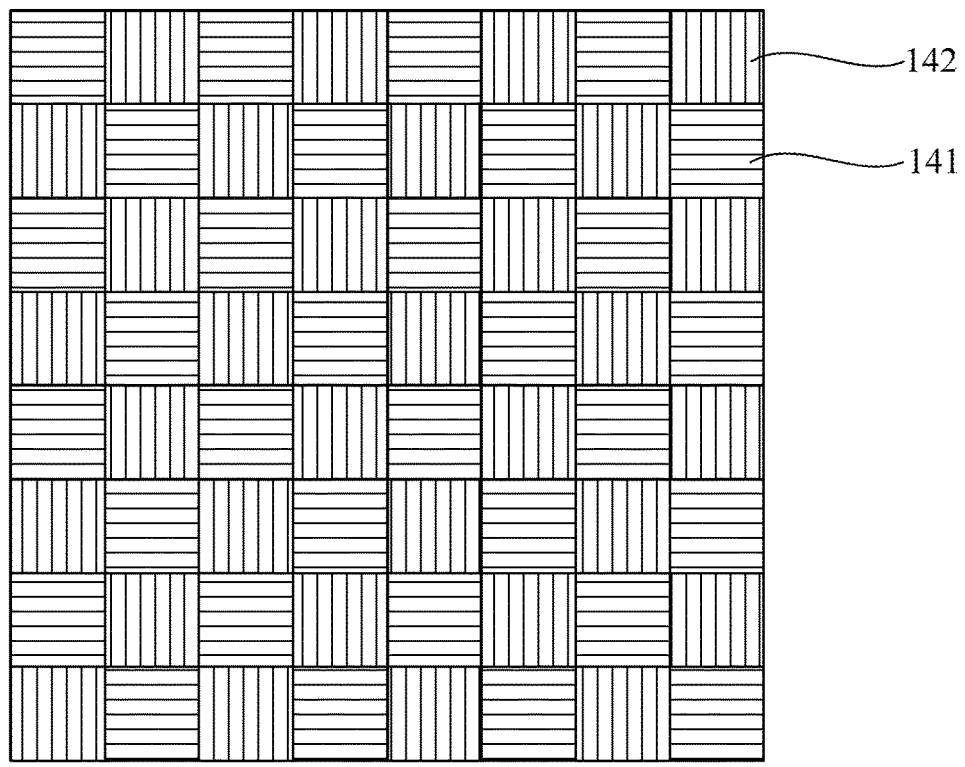
FIG. 3 illustrates a schematic structural diagram of a light sensor according to exemplary embodiments of the disclosure.

As illustrated in FIG. 3, the light sensor 14 includes N first regions 141 and M second regions 142, and the total area of the N first regions 141 is equal to that of the M second regions 142. N is a natural number, and M is a natural number. Each of the first regions 141 includes a second polarizing component (not illustrated) and K photodetectors (not illustrated) arranged in an array. The second polarizing component is located above the K photodetectors. Each of the second regions 142 includes a third polarizing component (not illustrated) and L photodetectors (not illustrated) arranged in an array. The third polarizing component is located above the L photodetectors. K is a natural number, and L is a natural number. Moreover, the polarization direction of the second polarizing component is parallel to that of the first polarizing component, and the polarization direction of the second polarizing component is perpendicular to that of the third polarizing component. In other words, the array of photodetectors of the light sensor 14 is divided into the N first regions 141 and the M second regions 142. The second polarizing component is provided above the photodetectors in the first region 141, and the third polarizing component is provided above the photodetectors in the second region 142.

As such, the photodetectors in the first region 141 not only can detect the light emitted towards the light sensor 14 by the display panel 13, but also can detect the ambient light successively passing through the glass cover plate 12, the first polarizing component 15 and the display panel 13. The photodetectors in the second region 142 can merely detect the light emitted towards the light sensor 14 by the display panel 13, but not the ambient light.

Therefore, a detection result of the N first regions and a detection result of the M second regions are equivalent to two detection results of a same photosensitive region under two situations. In one of the situations, the photosensitive region can be used for detecting both intensity information of the ambient light and intensity information of the light emitted by the display panel. In the other situation, the photosensitive region is merely used for detecting the intensity information of the light emitted by the display panel. Therefore, the intensity information of the ambient light detected at the N first regions can be obtained by subtracting the intensity information, detected at the M second regions, of the light emitted by the display panel from the intensity information, detected at the N first regions, of the ambient light and of the light emitted by the display panel. In summary, by detecting the intensity information of the light emitted by the display panel, the influence, by the light emitted by the display panel, on the intensity of the ambient light detected by the light sensor can thus be eliminated, so as to improve the detection accuracy of the light sensor.

In exemplary embodiments of the disclosure, a light sensor includes (e.g., are divided into) N first regions and M second regions, each of the first regions includes a second polarizing component and K photodetectors arranged in an array, and the second polarizing component is located above the K photodetectors. The polarization direction of the second polarizing component is parallel to that of a first polarizing component, and therefore, the K photodetectors in the each of the N first regions can detect intensity information of ambient light and intensity information of light emitted by a display panel. Each of the second regions includes a third polarizing component and L photodetectors arranged in an array, and the third polarizing component is located above the L photodetectors. The polarization direction of the second polarizing component is perpendicular to that of the third polarizing component, and therefore, the L photodetectors in each of the M second regions can detect the intensity information of the light emitted by the display panel, but not the intensity information of the ambient light. Moreover, since the total area of the N first regions is equal to the total area of the M second regions, a detection result of the N first regions and the detection result of the M second regions can be equivalent to two detection results of a same photosensitive region under two situations.

In one of the situations, the intensity information of the ambient light and the intensity information of light emitted by the display panel can both be detected at the photosensitive region, and in the other situation, merely the intensity information of the light emitted by the display panel can be detected at the photosensitive region. Therefore, by detecting the intensity information of the light emitted by the display panel, the influence, by the light emitted by the display panel, on the intensity of the ambient light detected by the light sensor can further be eliminated, so as to improve the detection accuracy of the light sensor.

In exemplary embodiments of the disclosure, by physically filtering out (instead of filtering out at a photoelectrical level or with software) light wave signals emitted by the display panel, the detection precision of the light sensor is improved, and more accurate input information of light intensity values is provided for automatic backlight adjustment. Therefore, no requirement on the structure, such as openings and color transmittance, of the mobile terminal is needed any more, thus reducing the complexity in structural design of the light sensor and reducing design costs.

In general, ambient light is not natural light, and is polarized to a certain extent. Therefore, considering such a situation, the structure as illustrated in FIG. 2 may be used to simplify the structure of the mobile terminal.

As illustrated in FIG. 2, the first polarizing component 15 may include a first phase delayer 151 and a first polarizer 152. The first phase delayer is a quarter-wave plate. The first polarizer 152 is located between the first phase delayer 151 and the display panel 13, and the polarization direction of the first polarizer 152 is the polarization direction of the first polarizing component 15. In this embodiment, the ambient light passing through the first phase delayer 151 is a set of a lot of elliptically polarized light with various major-to-minor axis ratios, and the elliptically polarized light becomes linear polarized light after passing through the first polarizer 152.

Figure 4:
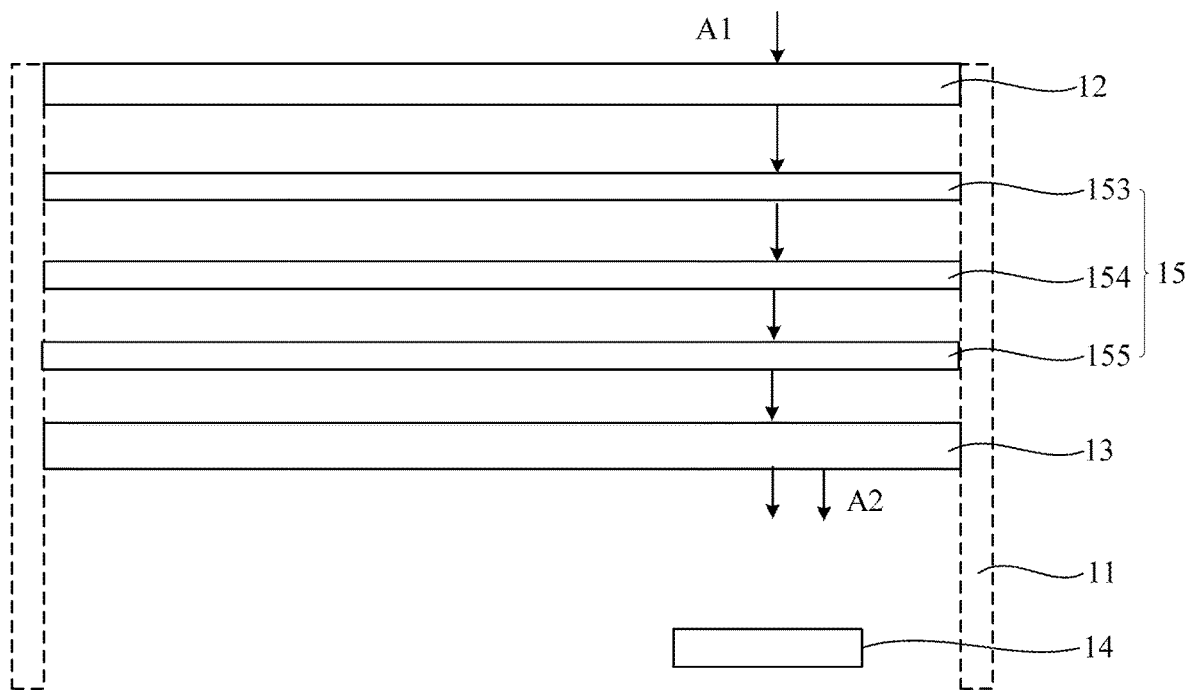
FIG. 4 illustrates a cross-sectional schematic diagram of the mobile terminal according to exemplary embodiments of the disclosure.

Since ambient light is not natural light and is polarized to some extent, while the polarized state of the ambient light cannot be determined in advance, the structure as illustrated in FIG. 4 may be used for the mobile terminal in order to improve the detection accuracy of the light sensor.

As illustrated in FIG. 4, the first polarizing component 15 may include a second polarizer 153, a second phase delayer 154, and a third polarizer 155. The second phase delayer 154 is a quarter-wave plate. The second phase delayer 154 is located between the second polarizer 153 and the third polarizer 155. The second polarizer 153 is located at a side of the second phase delayer 154 away from the display panel 13. An included angle between the polarization direction of the second polarizer 153 and an optical axis of the second phase delayer is 45 degrees, and the polarization direction of the third polarizer is the polarization direction of the first polarizing component. The ambient light having passed through the second polarizer 153 is linear polarized light, the linear polarized light becomes circular polarized light after passing through the second phase delayer 154, and the circular polarized light becomes linear polarized light after passing through the third polarizer 155.

Moreover, the intensity of the ambient light having passed through the second polarizer 153 is reduced to a half of the intensity of the ambient light before passing through the second polarizer 153; the intensity of the ambient light having passed through the second phase delayer 154 keeps unchanged; and the intensity of the ambient light having passed through the third polarizer 155 is reduced to a half of the intensity of the ambient light before passing through the third polarizer 155. In this embodiment, the intensity of the ambient light having passed through the first polarizing component 15 is reduced to a quarter of the intensity of the ambient light before passing through the first polarizing component 15. Therefore, the intensity information of the ambient light can be accurately determined, facilitating subsequently acquiring accurate intensity information of the ambient light, improving the detection accuracy of the light sensor.

In another exemplary embodiment, in order to further simplify the structure of the mobile terminal the first polarizing component 15 may merely include a fourth polarizer, and the polarization direction of the fourth polarizer is the polarization direction of the first polarizing component. The ambient light becomes linear polarized light after passing through the fourth polarizer.

Figure 5:
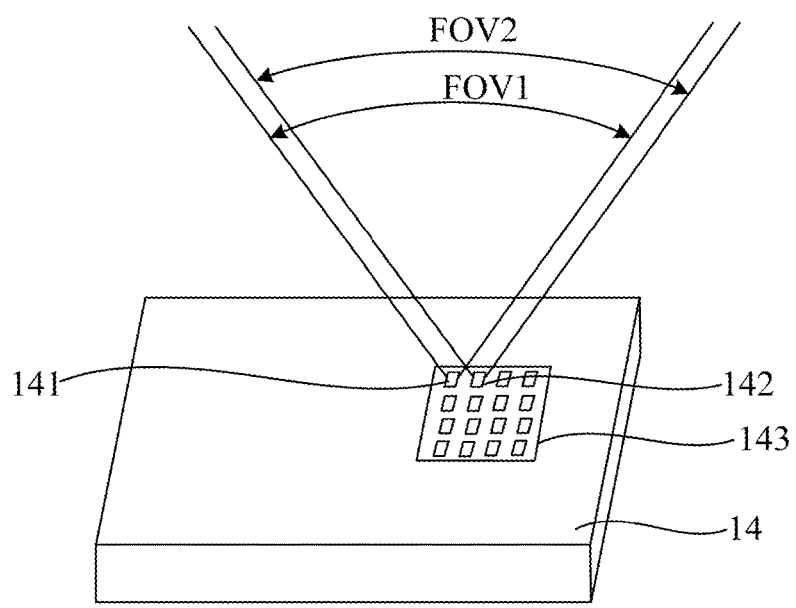
FIG. 5 illustrates a schematic diagram of fields of view of a light sensor according to exemplary embodiments of the disclosure.

In an embodiment, N may be 1, 2, 3, 4 or other natural numbers, and M may be 1, 2, 3, 4 or other natural numbers. Preferably, N is a natural number greater than 1, and M is a natural number greater than 1. In other words, the light sensor may include multiple first regions 141 and multiple second regions 142. In general, as illustrated in FIG. 5, the total area occupied by the array 143 of photodetectors of the light sensor is about 400 μm*400 μm. Since the area occupied by the array of photodetectors is small, after dividing the array of photodetectors of the light sensor into multiple first regions 141 and multiple second regions 142, the field of view FOV1 of the first region 141 and the field of view FOV2 of the second region 142 in the array of photodetectors are substantially the same. As such, it can be ensured that the second region 142 can receive light emitted by the display panel.

In an embodiment, as illustrated in FIG. 3, the first regions 141 and the second regions 142 may be arranged alternately. In particular, the first regions 141 and the second regions 142 may be arranged alternately in the row direction, or the first regions 141 and the second regions 142 may be arranged alternately in the column direction.

Figure 6:
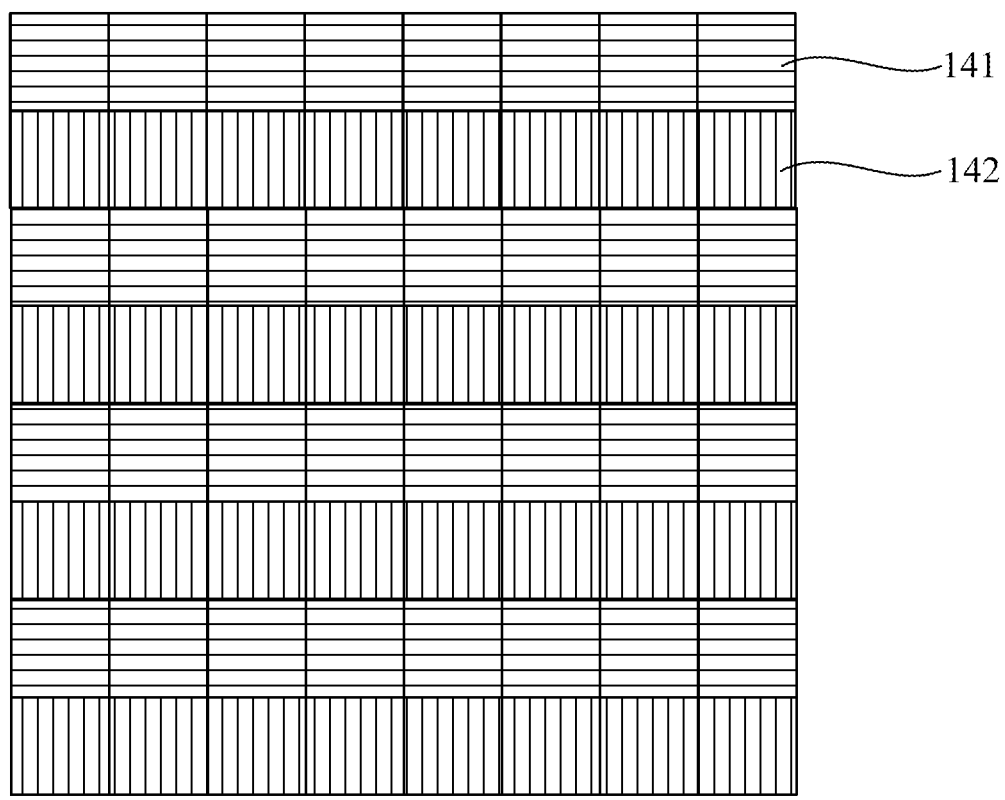
FIG. 6 illustrates a schematic structural diagram of a light sensor according to exemplary embodiments of the disclosure.

In another embodiment, as illustrated in FIG. 6, the N first regions 141 may be arranged in F rows, and the M second regions 142 may be arranged in G rows. Any two immediate rows of the first regions 141 is separated by a row of the second regions 142, and any two immediate rows of the second regions 142 are separated by a row of the first regions 141. F is a natural number, and G is a natural number. In particular, F may be 1, 2, 3, 4 or other natural numbers. G may be 1, 2, 3, 4 or other natural numbers. In this embodiment, a same row contains either only first regions 141 or only second regions 142, and when preparing a second polarizing component or a third polarizing component, only one polarizing component may be prepared in a same row instead of multiple second polarizing components or third polarizing components. Thus, the preparing process can be simplified.

Figure 7:
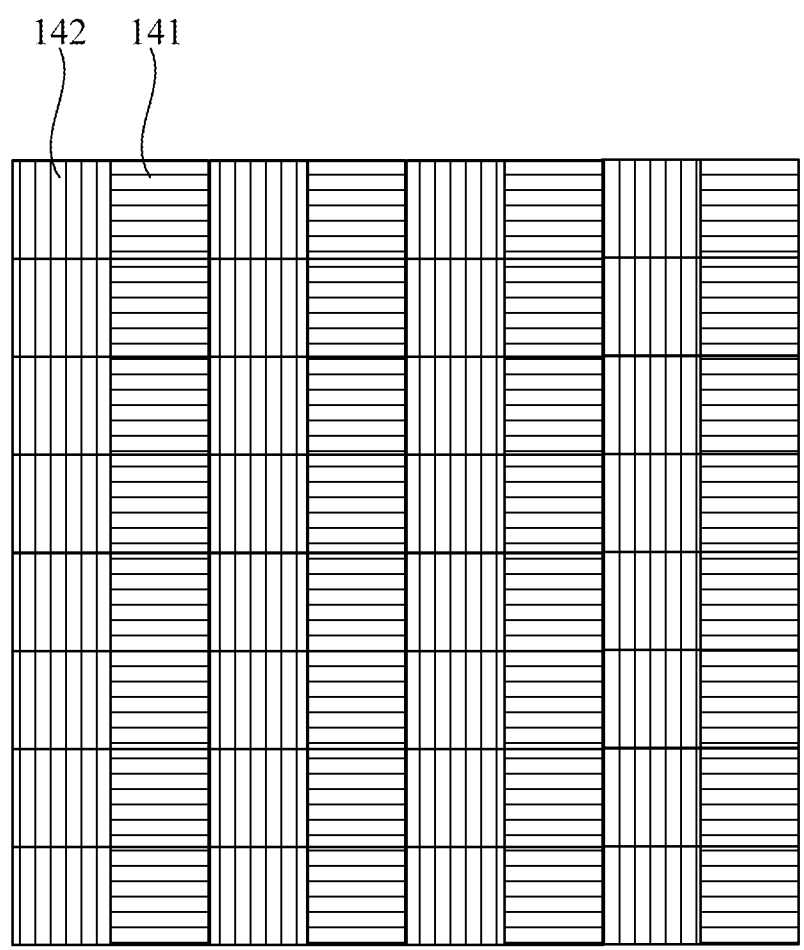
FIG. 7 illustrates a schematic structural diagram of a light sensor according to exemplary embodiments of the disclosure.

In another embodiment, as illustrated in FIG. 7, the N first regions 141 may be arranged in F columns, and the M second regions 142 may be arranged in G columns. Any two immediate columns of the first regions 141 are separated by a column of the second regions 142, and any two immediate columns 142 of the second regions are separated by a column of the first regions 141. F is a natural number, and G is a natural number. In this embodiment, a same column contains either only first regions 141 or only second regions 142, and when preparing a second polarizing component or a third polarizing component, only one polarizing component may be prepared in a same column instead of multiple second polarizing components or third polarizing components. Thus, the preparing process can be simplified.

In an embodiment, the area of the first region may be equal to that of the second region. Further, K may be equal to L. In other words, the number of photodetectors in each of the first regions is the same as the number of photodetectors in each of the second regions. K may be equal to 2, 4, 16, 64 or 256.

In an embodiment, K is equal to L, and the square root of K is an integer. The first region has a square shape, and the second region has a square shape. The side length of the first region is equal to the side length of the second region. Furthermore, the photodetectors in the first region are arranged in a square matrix, that is, the number of photodetector rows is the same as the number of photodetector columns. The photodetectors in the second region 142 are also arranged in a square matrix. For example, when the number of photodetectors in the first region is 16, the photodetectors are arranged in a 4*4 square matrix.

In an exemplary embodiment, the mobile terminal may further include a first processing circuit, a second processing circuit, and a third processing circuit. The photodetectors in all of the first regions 141 are electrically connected to the first processing circuit, and the photodetectors in all of the second regions 142 are electrically connected to the second processing circuit. Each of the first processing circuit and the second processing circuit are electrically connected to the third processing circuit. The photodetectors are configured to convert a received optical signal into an electric current signal, so as to be processed by the processing circuits.

The first processing circuit is configured to process the electric current signal output by the photodetectors in the first regions 141 to obtain a first processing result. The first processing result carries first intensity information of ambient light and second intensity information of light emitted by the display panel. The second processing circuit is configured to process the electric current signal output by the photodetectors in the second regions 142 to obtain a second processing result. The second processing result carries the second intensity information of the light emitted by the display panel. The third processing circuit is configured to obtain the first intensity information of the ambient light according to the first processing result and the second processing result. In particular, the third processing circuit may subtract the second processing result from the first processing result to obtain the first intensity information of the ambient light.

In an embodiment, the first processing circuit may include an active front end (AFE) processing circuit and an analog-to-digital converter. The AFE processing circuit may be configured to filter and amplify the received electric current signal, and then output the processed electric current signal to the analog-to-digital converter. The analog-to-digital converter performs integration on the received electric current signal in a specified integration duration, to obtain a first integration result.

The structure of the second processing circuit may be identical with that of the first processing circuit. The second processing circuit also filters and amplifies a received electric current signal, and then performs integration on the processed electric current signal in a specified integration duration, to acquire a second integration result.

The third processing circuit may acquire the first integration result and the second integration result, and acquire a difference by subtracting the second integration result from the first integration result, so as to acquire the first intensity information of the ambient light according to the difference.

In an embodiment, the AFE processing circuit may include a first-stage operational amplifier circuit, a second-stage operational amplifier circuit and a third-stage operational amplifier circuit, but is not limited thereto. The first-stage operational amplifier circuit may be used for eliminating a bias voltage, and amplifying the electric current signal with the bias voltage eliminated. The second operational amplifier circuit may filter and then amplify the electric current signal output by the first-stage operational amplifier circuit. The third-stage operational amplifier circuit may filter and then amplify the electric current signal output by the second-stage operational amplifier circuit. The amplification gains of the first-stage operational amplifier circuit, the second-stage operational amplifier circuit and the third-stage operational amplifier circuit may be determined by their respective feedback resistances.

In an embodiment, the above setting parameters of the amplification gains and the setting parameters of integration duration may be pre-stored in a register, and the amplification gains and the integration duration above may be configured through an I2C bus of a processor of the light sensor. The setting of the integration duration may be completed by an internal phase-locked loop and clock pulses.

In an embodiment, after the first processing circuit obtains the first integration result, a first interruption signal may be sent to the processor of the light sensor, so as to notify the processor to acquire the first integration result. The processor may acquire the first integration result through the I2C bus, clear the interruption after acquiring the second integration result, and restart the analog-to-digital converter.

Similarly, when the second processing circuit obtains the second integration result, a second interrupting signal may be sent to the processor of the light sensor, so as to notify the processor to acquire the second integration result. The processor may acquire the second integration result through the I2C bus, clear the interruption after acquiring the second integration result, and restart the analog-to-digital converter.

In an embodiment, the mobile terminal may further include a foam layer. The foam layer is located between the display panel 13 and the light sensor 14. The foam layer may include a through-hole, and a projection of the light sensor 14 on the display panel 13 falls within a projection of the through-hole on the display panel 13. As such, the ambient light may transmit through the through-hole to the light sensor 14.

In an embodiment, the mobile terminal may further include an encapsulation layer. The encapsulation layer is located at a side of the first polarizing component 15 away from the display panel 13.

In an embodiment, the display panel may be a flexible display panel. In another embodiment, the display panel may be a foldable display panel.

In an embodiment, the light sensor 14 may be an ambient light sensor, an image sensor (camera), a 3D range sensor, or a fingerprint sensor. The 3D range sensor may be a 3D structured optical device, and the 3D structured optical device may be an infrared lens (infrared transmitter), a floodlight sensing element, or a dot projector. In an embodiment, there may be multiple light sensors 14.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of data processing apparatus.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "1" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A mobile terminal, comprising:
   a display panel;
   a first polarizing component arranged on a first side of the display panel; and
   a light sensor arranged on an opposing second side of the display panel that is configured to receive ambient light and light emitted by the display panel, the ambient light being incident onto the light sensor after passing through the first polarizing component and the display panel, and the ambient light being linear polarized light having passed through the first polarizing component, the light sensor including N first regions and M second regions, where a total area of the N first regions is equal to that of the M second regions, and N and M are natural numbers, wherein:
   each of the first regions includes a second polarizing component and K photodetectors arranged in an array, where the second polarizing component is located above the K photodetectors, and a polarization direction of the second polarizing component is parallel to that of the first polarizing component; and each of the second regions includes a third polarizing component and L photodetectors arranged in an array, where the third polarizing component is located above the L photodetectors, K and L are natural numbers, and a polarization direction of the third polarizing component is perpendicular to that of the second polarizing component.

2. The mobile terminal according to claim 1, the first polarizing component further including a first phase delayer that is a quarter-wave plate and a first polarizer,
wherein the first polarizer is located between the first phase delayer and the display panel, and a polarization direction of the first polarizer is the polarization direction of the first polarizing component.

3. The mobile terminal according to claim 1, the first polarizing component further including a second polarizer, a second phase delayer that is a quarter-wave plate, and a third polarizer, the second phase delayer being located between the second polarizer and the third polarizer, wherein:
the second polarizer is located at a side of the second phase delayer away from the display panel,
a polarization direction of the second polarizer has an angle of 45 degrees from an optical axis of the second phase delayer, and
a polarization direction of the third polarizer is the polarization direction of the first polarizing component.

4. The mobile terminal according to claim 1, wherein the first polarizing component further comprises a fourth polarizer, and a polarization direction of the fourth polarizer is the polarization direction of the first polarizing component.

5. The mobile terminal according to claim 1, wherein:
N and M are natural numbers greater than 1, and
the first regions and the second regions are arranged in one of the following ways:
the first regions and the second regions are arranged alternately;
the N first regions are arranged in F rows, the M second regions are arranged in G rows, any two immediate rows of the first regions are separated by a row of the second regions, and any two immediate rows of the second regions are separated by a row of the first regions, with F and G being natural numbers; or
the N first regions are arranged in F columns, the M second regions are arranged in G columns, any two immediate columns of the first regions are separated by a column of the second regions, and any two immediate columns of the second regions are separated by a column of the first regions, with F and G being natural numbers.

6. The mobile terminal according to claim 1, wherein an area of the first region is equal to that of the second region, K is equal to L, and K is equal to 2, 4, 16, 64 or 256; and
wherein when a square root of K is an integer, the first region has a square shape, the second region has a square shape, the K photodetectors in the first region are arranged in a square matrix, and the L photodetectors in the second region are arranged in a square matrix.

7. The mobile terminal according to claim 1, further comprising a first processing circuit, a second processing circuit, and a third processing circuit, wherein:
the photodetectors in the first regions are electrically connected to the first processing circuit, the photodetectors in the second regions are electrically connected to the second processing circuit, and each of the first processing circuit and the second processing circuit is electrically connected to the third processing circuit,
a first processing result of the first processing circuit carries first intensity information of the ambient light and second intensity information of the light emitted by the display panel, and a second processing result of the second processing circuit carries the second intensity information of the light emitted by the display panel, and
the third processing circuit is configured to obtain the first intensity information of the ambient light according to the first processing result and the second processing result.

8. The mobile terminal according to claim 1, further comprising a foam layer that is located between the display panel and the light sensor, the foam layer including a through-hole, and a projection of the light sensor on the display panel falls within a projection of the through-hole on the display panel.

9. The mobile terminal according to claim 1, further comprising an encapsulation layer that is located at a side of the first polarizing component away from the display panel.

10. The mobile terminal according to claim 1, wherein the display panel is a flexible display panel or a foldable display panel.

* * * * *